United States Patent [19]

Kudelski

[11] Patent Number: 4,591,768
[45] Date of Patent: May 27, 1986

[54] CONTROL SYSTEM FOR AN ELECTRIC MOTOR

[75] Inventor: Stefan Kudelski, Le Mont-sur-Lausanne, Switzerland

[73] Assignees: Ampex Corporation, Redwood City, Calif.; Kudelski S.A., Lausanne, Switzerland

[21] Appl. No.: 533,850

[22] Filed: Sep. 15, 1983

[30] Foreign Application Priority Data

Sep. 17, 1982 [GB] United Kingdom ............ 8226574

[51] Int. Cl.$^4$ .............................................. H02P 5/16
[52] U.S. Cl. .................................. 318/327; 318/326; 318/341; 318/314; 318/599
[58] Field of Search ............... 318/326, 327, 328, 329, 318/330, 341, 599, 6, 636, 314, 310, 311, 312, 313, 315

[56] References Cited

U.S. PATENT DOCUMENTS

| | | | |
|---|---|---|---|
| 3,095,530 | 6/1963 | Woodward | 318/341 X |
| 3,355,649 | 11/1967 | Boylan et al. | 318/315 X |
| 3,437,826 | 4/1969 | Kelley | 318/599 X |
| 3,568,022 | 3/1971 | Domann | 318/800 |
| 3,586,949 | 6/1971 | Spear | 318/326 X |
| 3,596,162 | 7/1971 | Takayama | 318/341 |
| 3,629,633 | 12/1971 | O'Callaghan | 318/317 X |
| 3,633,086 | 1/1972 | Speth | 318/489 |
| 3,731,169 | 5/1973 | Burgholte et al. | 318/801 |
| 3,800,196 | 3/1974 | Zimmermann | 318/328 X |
| 3,970,909 | 7/1976 | Minakuchi | 318/327 X |
| 3,983,464 | 9/1976 | Peterson | 318/327 |
| 4,109,184 | 8/1978 | Weber | 318/327 |
| 4,149,117 | 4/1979 | Weber | 318/315 |
| 4,153,864 | 5/1979 | Minakuchi | 318/328 X |
| 4,182,979 | 1/1980 | Douglas et al. | 318/434 |
| 4,240,014 | 12/1980 | Müller | 318/328 |
| 4,309,645 | 1/1982 | De Villeneuve | 318/341 |
| 4,337,424 | 6/1982 | Cap et al. | 318/328 |
| 4,476,417 | 10/1984 | Zimmermann | 318/329 |

Primary Examiner—Bernard Roskoski
Assistant Examiner—Shik Luen Paul Ip
Attorney, Agent, or Firm—Harry G. Thibault; George B. Almeida; Joel D. Talcott

[57] ABSTRACT

A control system for a motor which drives a tape capstan includes a capacitor (91) which holds a sample of a ramp signal which is sampled and restarted in response to tachometer pulses. The output of an amplifier (90, 100) which amplifies the difference between the stored voltage and a reference is integrated by a passive integrator (106, 92) coupled to the capacitor (91). The arrangement provides prediction of change of a discontinuous speed signal and is useful for slow running motors of low inertia.

10 Claims, 4 Drawing Figures

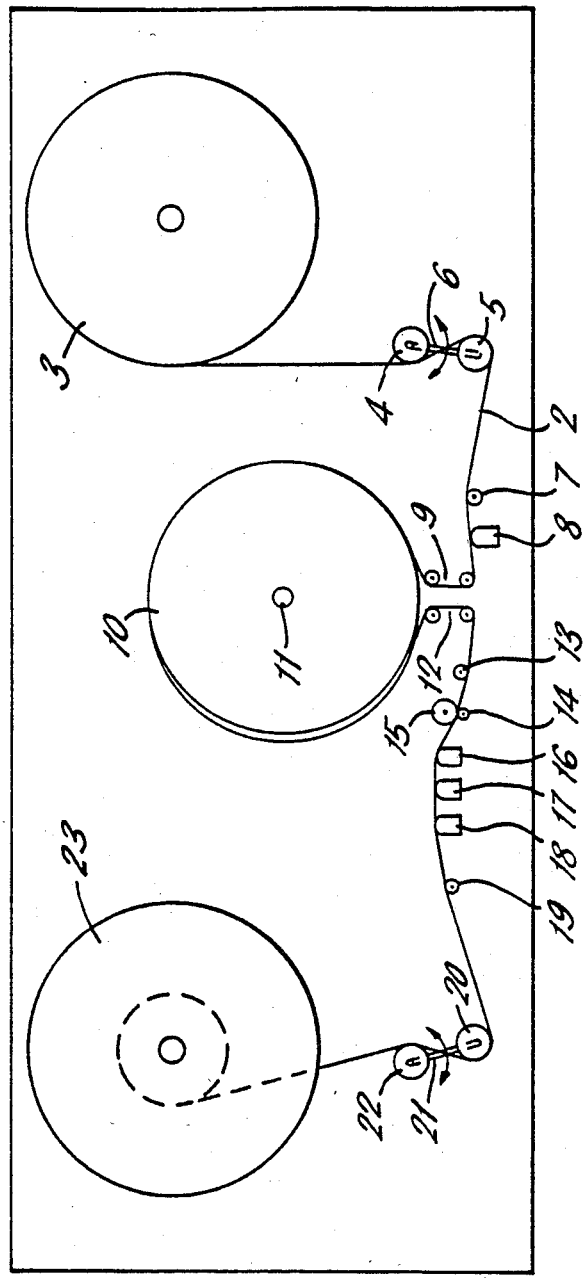

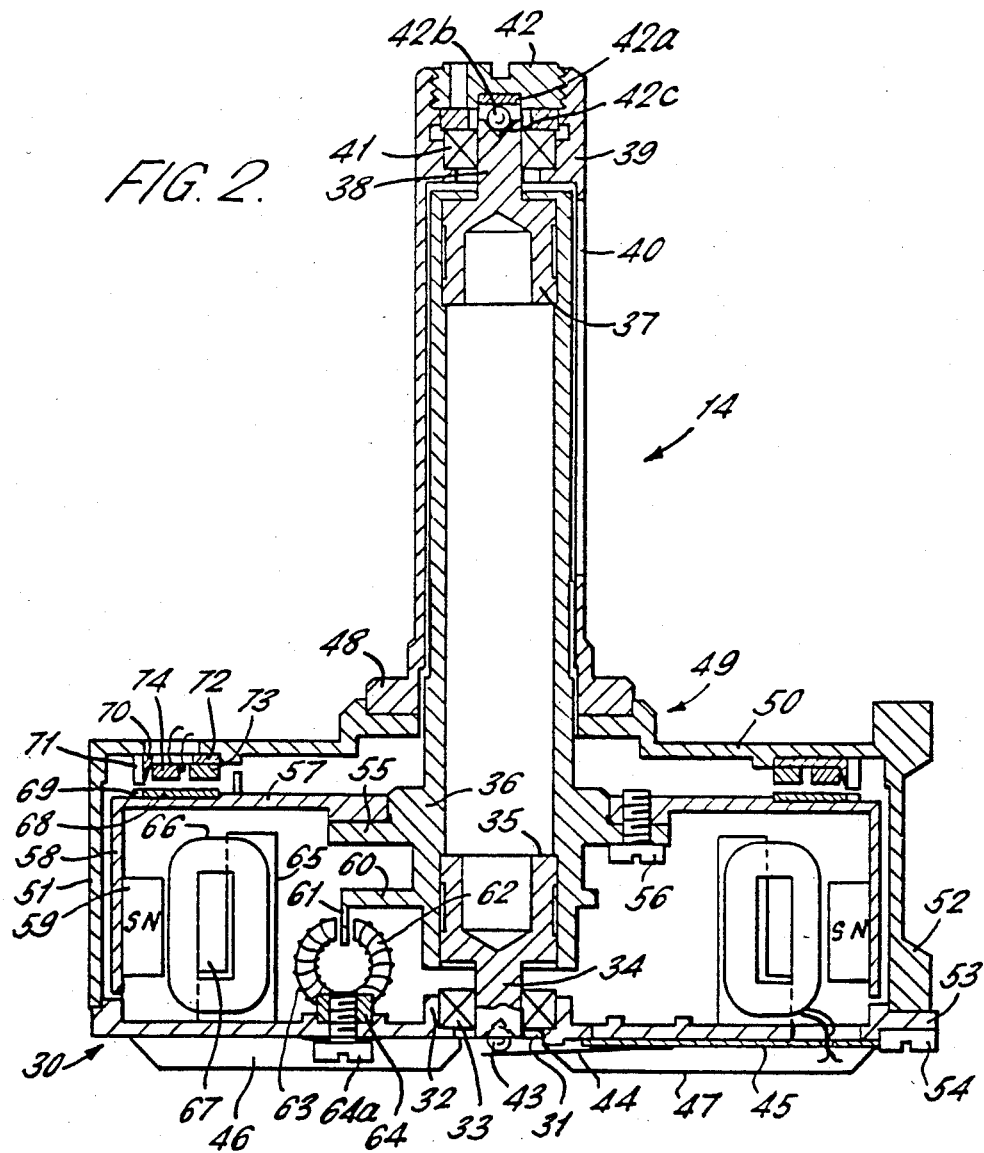

[4,591,768]

CONTROL SYSTEM FOR AN ELECTRIC MOTOR

BACKGROUND TO THE INVENTION

This invention relates to control systems for electric motors and in particular to systems which are suitable for the accurate control of motors of which the speed/inertia ratio is low.

One feature of a control system for which the invention is intended is a comparatively low running speed of the driven motor. The significance of this feature is that if, as is usual, the speed of the motor is monitored, either directly by a tachogenerator or indirectly by means of a control track on tape driven by a capstan of which the motor is a part, the information rate obtainable is inevitably quite low. In practical terms this means that the speed of the motor or the tape is known, or measured, only at discrete times separated by intervals which may be quite long in comparison with the response of the motor. The effect of this is that the motor is capable of a significant change in speed between the intervals of sampling and accordingly the driving signal, which in ordinary control systems is determined by the measured speed signal, is inaccurate for most of the time. The system tends to instability, especially if the forward open loop gain of the system is high.

A second feature is that the inertia of the motor is correspondingly low. As previously indicated, this feature is not independent of the first and the invention is intended for use when the ratio of speed to inertia is low. Although a precise figure cannot readily be given, it will be apparent that such a ratio may often occur for a motor which is connected to drive a small capstan in a portable tape recorder. A specific embodiment of the invention concerns a capstan driven by a brushless DC motor. Such a motor has the advantages of reliable, quiet operation, independence of moisture and low friction. However, it has low inertia and, when used for driving a tape capstan, will be used at quite a low speed.

Whereas in a non-portable tape recorder a motor can be associated with a flywheel, which facilitates the obtaining of stability, such an expedient is unsuitable if low speed and low inertia is desirable, especially in a portable video tape recorder.

It is accordingly a general object of the invention to provide an improved control system for a motor.

It is another, more specific, object of the invention to provide a control system which is particularly suitable for motors of which the speed/inertia ratio is low.

Another, more specific object of the invention is to provide a capstan motor and control system suitable for use in a portable video tape recorder.

SUMMARY OF THE INVENTION

Although the invention is not necessarily limited to the details now set forth, for the sake of example a preferred embodiment of the invention includes means for providing pulses constituting a speed signal, a ramp generator responsive to said pulses to provide a ramp signal, means responsive to said pulses to provide sampling of the ramp signal and the holding of a sample of the ramp signal in a capacitative store, an amplifier responsive to the signal in the capacitative store and a reference signal to provide a drive signal for a motor which may drive a capstan. A feedback loop for the amplifier includes an integrator, preferably a passive integrator, which is connected to the aforementioned store so as to augment or diminish the speed signal held by the store by a signal representing an integration of a change in torque applied to the motor and so to anticipate or predict the change in speed as measured by successive samplings of the ramp signal. As will be explained, this prediction increases the accuracy of the error signal driving the amplifier and facilitates the provision of high gain without attendant instability.

As has been indicated the source of the speed signal may be a tachometer generator driven by the capstan or means responsive to the movement of the tape driven by the capstan.

The foregoing and various other objects and advantages of the present invention will be apparent from the following description of a system for controlling a tape-driven capstan.

BRIEF DESCRIPTION OF THE ACCOMPANYING DRAWINGS

FIG. 1 is an explanatory schematic diagram of the principal parts of a video tape recorder;

FIG. 2 is a sectional view of one example of a capstan and tachometer assembly for use in the recorder depicted in FIG. 1;

FIG. 3 is a drawing illustrating a detail of the assembly shown in FIG. 2; and

DETAILED DESCRIPTION OF THE PREFERRED EMBODIMENT

Figure 4:
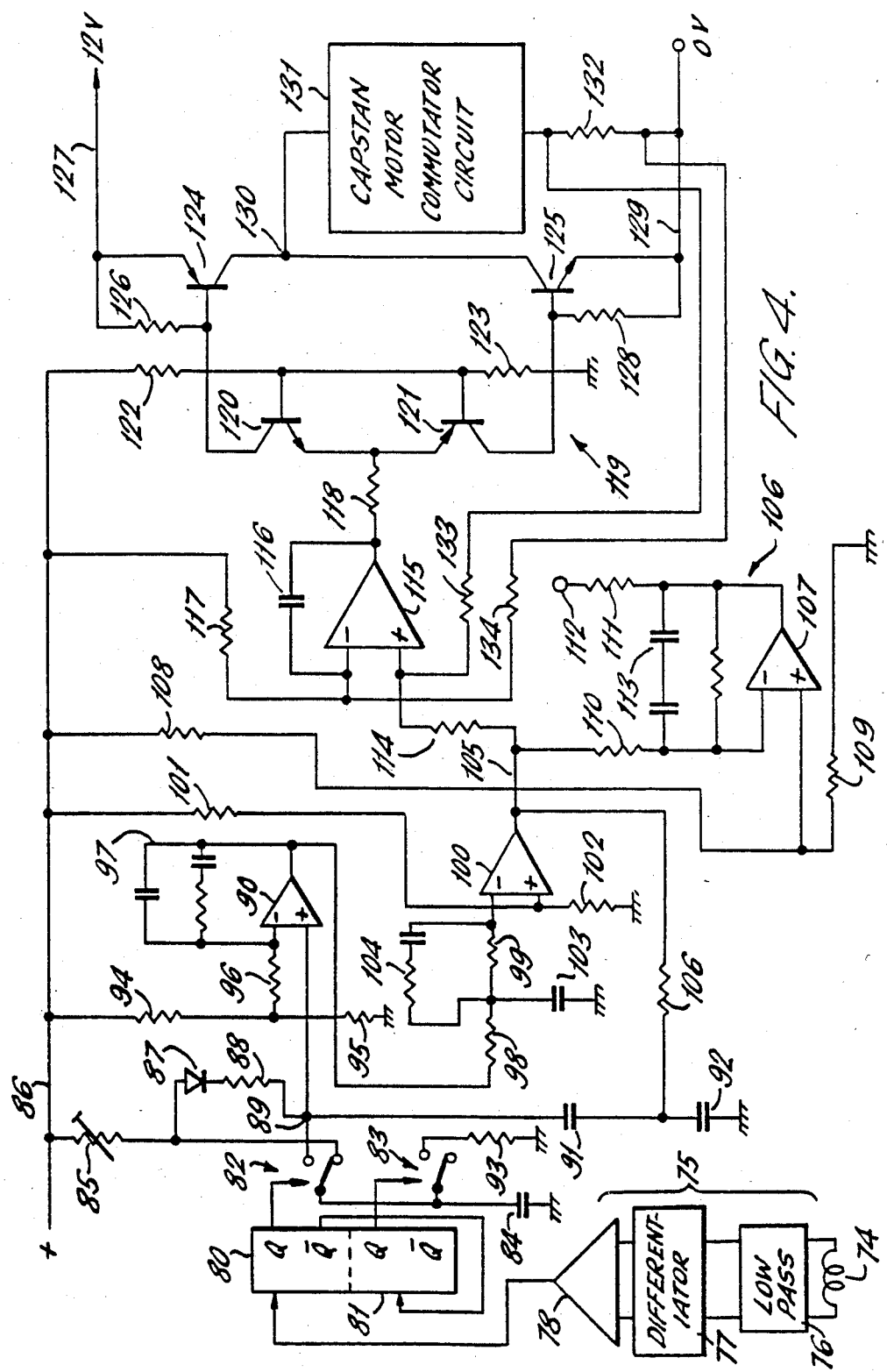
FIG. 4 is a schematic diagram of an electrical servo-mechanism arranged for the control of the capstan shown in FIG. 2.

FIG. 1 illustrates in simplified form the principal parts of a video tape recorder, this recorder being an example of a system in which the capstan, its motor and the servo-mechanism described later may conveniently be used. As is shown in FIG. 1, the recorder 1 is intended for recording signals on or playing back signals from a magnetic tape 2 which is supplied by a supply reel 3 driven by a motor not shown. From the supply reel the path of the tape 2 extends around a rotatable guide post 4 and thence to a rotatable guide 5 which is carried at one end of an arm 6 mounted coaxially with the guide 4. The purpose of the pivoted arm is to provide sensing of the tension of tape in a loop around the guide 5, it being apparent that if the tension in the tape of this loop increases, the arm 6 will rotate. The rotation of the arm can be sensed by any convenient known means and used in known manner to control the motor which drives the reel 3 in order to maintain a substantially constant length of tape in the loop.

From the guide 5 the path of the tape extends past a guide 7 and a video erase head 8 to a pair of guides 9 controlling the entrance of the tape to a helical path extending around a drum 10 of which the axis 11 is slightly tilted relative to the general plane of the path of the tape. Within the drum is a motor driving around the periphery of the drum a scanning head for the scanning of the tape in oblique tracks, in a manner generally known per se. At the end of the helical path of the tape around the drum 10 the tape passes around a pair of guides 12 and extends past a guide 13 to a capstan 14 which is provided with a pinch roller 15 for the maintenance of the tape in close proximity to the capstan. The tape path extends from the capstan past erase, audio and control track heads 16 to 18, a further guide post 19, a guide 20 mounted at one end of a pivoted arm 21, a guide post 22 disposed coaxially with the pivot for the arm 21 and finally to a take-up reel 23. The guide 20 acts in a manner similar to the guide 5, the pivoting movement of the arm 21 providing a measure of the tension in the loop of tape around the guide 20 and providing a control for the motor (not shown) which drives the take-up reel 23.

The longitudinal speed of traverse of the tape is controlled by the capstan 14, which must provide high performance, and be driven with a considerable degree of stability.

FIG. 2 illustrates a preferred construction for the capstan 14.

The capstan 14 has a base plate 30 which has a central aperture 31 and surrounding the aperture an upwardly extending annular flange 32 which accommodates a bearing 33. The bearing supports for rotation a spigot 34 constituting a lower extension of a cylindrical bush 35 fitted within a cylindrical capstan member 36 which extends upwardly. At the top end of the cylindrical member 36 is an upper bushing 37 from the top end of which extends a spigot 38. Surrounding (with a small clearance) the member 36 for most of the length thereof and extending above the top of the member 36 is a generally cylindrical shell 39 which has an aperture 40 extending axially of the cylindrical member 36 and also extending around a substantial part of the periphery of the member 36 so as to enable the outer surface of the cylindrical member 36 to engage a magnetic tape. At the upper end of the shell 39 is supported an upper bearing 41 in which the spigot 38 is received for rotation. The top end of the shell is closed by a screw-threaded plug 42, which carries a sapphire seat 42a engaged by a ball 42b disposed in a conical seat 42c in the top of the spigot 38.

At the end of the lower spigot 34 of previous mention is accommodated a ball 43 which protrudes below the spigot 34 and is engaged by a leaf spring 44 secured, for example, by adhesive to a plate 45 likewise secured to the underside of the plate 30. The spring 44 in conjunction with the ball 43 provides an electrical earth for the capstan member 36.

Below the base plate 30 extend radial ribs 46 and 47 which reinforce the plate 30.

At its lower end, the shell 39 is provided with a radial flange 48 by means of which it is mounted at the inner margin of the housing 49 for the motor which drives the capstan. The housing 49 consists principally of an annular plate 50 forming the top cover for the housing and a cylindrical side wall 51 extending downwardly from the periphery of the plate 50 to engage the periphery of the base plate 30. Extending vertically down the side wall 51 is a plurality of ribs 52, of which only one is shown. The ribs 52 are secured to outwardly extending lugs 53 from the base plate 30 by respective screws 54 (of which only one is shown). The housing 49 defines a generally annular space within which the motor is accommodated.

The cylindrical member 36 of capstan 14 has near its bottom end a radially extending flange 55 to which is secured, by means of screws such as the screw 56, the inner periphery of an inverted dish-shaped rotor comprising an annular portion 57 which is generally parallel to the cover plate 50 and a depending cylindrical wall 58 parallel to and just inside the cylindrical wall 51 which forms part of the housing 49. The rotor may be made of iron in order to provide a magnetic shield surrounding the motor, of which the stator is wholly accommodated within the space defined by the cylindrical wall 58.

The motor employed in the preferred embodiment of the capstan is a brushless DC motor. In such a motor, the magnetic circuit rotates whereas the windings which are normally disposed on the rotor of a DC motor are fixed in position. In the motor shown in FIG. 2, the rotor carries a plurality of permanent magnets 59, which are disposed at equally spaced intervals around the inner side of the wall 58 forming part of the rotor.

Below the location of the flange 55 are outwardly extending arms (of which only one is shown in the drawing), each such arm 60 having a downwardly depending magnetically permeable lug 61 of which the path of rotation extends through a gap in a part circular magnetically permeable core 62 which carries a coil 63 and is supported in a block 64 secured to the base plate 30 by means of a bolt 64a. The purpose of the coil 63 is to sense the entry of the lug 61 into the core 62 and thereby provide an indication of a particular angular position of the rotor for the capstan. As is well-known, a brushless DC motor must be provided with a switching circuit which acts in the manner of a commutator to switch the directions of current in the various parts of the stator winding. Although the particular construction and operation of the commutator circuit is not critical to the present invention, any of the known switching arrangements being suitable, the sensing coil 63 in conjunction with the extension of the rotor formed by the arm 60 and the lug 61 provides a convenient and reliable means of timing the switching performed by the commutation circuit. In general, the number of coils 63 will depend upon the number of phases of the stator winding and the number of lugs 61 will depend on the number of magnets provided on the rotor.

The stator winding, which in a brushless DC machine corresponds to the armature winding of an ordinary DC machine with commutator segments, is carried by a slotted annular member 65 disposed concentrically with the axis of the capstan and disposed on the base plate 30. The stator winding is illustrated diagrammatically at 66 and is wound around a former 67. The winding 66 extends in a circle concentric with the axis of the motor closely adjacent the annular path in which the magnets 59 travel. The magnets 59 are axially displaced from symmetry with respect to the winding 66 so that the rotor is urged upwardly, the upward pressure being sustained by the sapphire seat. Thus the motor needs only one thrust bearing, which is constituted by the readily accessible ball 42b and the seat 42a.

The capstan includes its own tachometer. This tachometer relies on a coil to sense the variation in magnetic flux caused by the variable reluctance of a magnetic circuit which extends between two similarly toothed magnetically permeable rings arranged in substantial axial register. One of the toothed rings is shown at 68, being carried on the upper surface of the plate 57 forming part of the rotor. Thus the ring 68 is disposed in a plane normal to the axis of the capstan and its rotor and is arranged concentrically of the capstan. The ring 68 has an outer toothed periphery 69, being formed in the manner of a gear wheel. The other ring, which is of similar radial dimension, is shown at 70. This ring has an outer toothed periphery similar in radial section to that of the ring 68. However, the ring 70 is made of greater axial depth at its outer periphery, so that the teeth 71 are of greater axial depth than the teeth 69. Inwardly of the periphery of the ring 70 is disposed a coil 74 which may have a plurality of turns and is disposed concentrically with the rings and thereby coaxially of the capstan and its rotor. The ends of this coil may be taken externally of the capstan housing by means of slots in the ring 70 and a cooperative slot in the cover plate 50.

Radially inwardly of the coil and disposed closely adjacent the lower side margin 72 of the ring 70 is a ring magnet 73, likewise arranged coaxially of the capstan assembly. This ring is polarised in the axial direction so that there is a flux path which extends radially of the ring 70, across the axial gap between the teeth 71 and 69, radially of the ring 68 and across the gap formed between the ring 73 and the ring 68. As is shown in FIG. 3, which illustrates in plan view part of the ring 68 and its teeth 69 and also, in ghost, the teeth 71 of the ring 70, as the rotor of the capstan motor moves, the teeth 69 and 71 go into and out of axial register, thus varying the reluctance of the air gap between them and therefore the flux density. The variation in flux density is approximately sinusoidal and is averaged around the common periphery of the rings 68 and 70. Thus the construction can provide quite an accurate sinusoidal representation of the movement between the rotor and the stationary parts of the motor and minor tolerances in machining are to a large extent smoothed out, it being readily feasible to process the signal obtained from the coil to achieve a substantially pure sinusoid.

The capstan and motor described with reference to FIGS. 2 and 3 are of quite simple construction and can readily (and preferably) be made of low inertia. However, they are described by way of example only.

FIG. 4 is a slightly simplified schematic drawing of the electrical part of a servo-mechanism which embodies the invention and which may be employed for driving the motor for the capstan shown in FIG. 2.

The tachometer coil 74 feeds the input of stages 75 which serve to shape and amplify the sinusoidal signal from the tachometer. These stages comprise a low pass filter 76 which serves to cut-off frequencies substantially above the ordinary range of variation of the fundamental frequency produced by the tachometer and differentiating stages 77 which serve to convert the sinusoidal tachometer signal into spike pulses which are amplified in an amplifier stage 78. The amplifier 78 feeds the input of one stage 80 of a dual monostable circuit of which the $\overline{Q}$ output triggers the second stage 81 of the dual monostable. These monostables control two switches 82 and 83 which would normally be constituted by transistor switches that are shown as mechanical switches for the sake of simplicity. These two switches are connected to one plate of an energy storage device such as a capacitor 84 of which the other plate is grounded. The switch 82 normally connects the capacitor 84 through a variable resistor 85 to a positive supply rail 86. The lower end of the resistor 85 is connected by way of a diode 87 and a resistor 88 of very high resistance to a junction point 89 connected to the noninverting input of an FET amplifier 90. The junction point 89 is connected to one plate of an energy storage device such as a capacitor 91 of which the other plate is connected to one plate of another energy storage device or capacitor 92 of which the other plate is grounded. For reasons which will be soon apparent, the capacitor 92 is of substantially greater capacity than the capacitor 91, for example 47 microfarads as compared with 3.3 microfarads. The junction point 89 is also connected to the second output of the switch 82. The switch 83 normally connectes the upper plate of capacitor 84 to a first output which is isolated. The second output of the switch 83 is connected by way of a low value resistor 93 to ground.

Before the remainder of the circuit is described, the operation of the switches 82 and 83 and the components associated therewith will be described.

The capacitor 84 constitutes in conjunction with the resistor 85 a ramp generator which is rendered operative when the switch 82 connects the capacitor 84 to the first output terminal of the switch 82. When the first monostable 80 is triggered by a derived tachometer pulse from the output of the amplifier 78, the Q output of the monostable 80 momentarily operates switch 82 so as to connect the capacitor 84 to the second output terminal of switch 82. Immediately thereafter the $\overline{Q}$ output of monostable 80 triggers monostable 81, of which the Q output operates switch 83 to connect the capacitor 84 to resistor 93, the switch 82 having meanwhile reverted to its former state in which the capacitor 84 is connected to resistor 85. These switching actions serve firstly to transfer charge from the capacitor 84 to the capacitor 91, the capacitor 91 thereby receiving a voltage representative of the ramp voltage which appeared across the capacitor 84, then to effect complete discharge of the capacitor 84 by way of the resistor 93, and finally to restart the generation of a ramp signal by means of the charging of capacitor 84 from the positive supply rail 86 through the resistor 85.

The capacitor 91 is much smaller than capacitor 92 in order that charge may be rapidly transferred to capacitor 91 without significant effect on the charge held by the capacitor 92. Because the two capacitors are connected in series in the charge path between junction 89 and ground, the smaller capacitor 91 receives substantially all the charge transferred from capacitor 84 during the momentary connection of capacitor 84 to the junction 89 by the operation of the switch 82. Thus there is a minimal effect on the charge held by the larger capacitor 92 which forms part of the passive integrator to be described further hereinafter.

A voltage divider constituted by resistors 94 and 95 provides a reference voltage at the inverting input of amplifier 90 by way of a comparatively large value resistor 96. The amplifier 90 has a mainly low pass feedback circuit 97 which provides some derivative control of stability in the forward direction of the amplifying circuit.

The amplifier 90 feeds by way of a resistor 98 and a resistor 99 the inverting input of a further FET amplifier 100, of which the non-inverting input is referenced by a voltage divider comprising resistors 101 and 102 connected between the positive rail 86 and ground. A resistor-capacitor branch 104 shunts the resistor 99 and a shunt capacitor 103 is connected between ground and the junction between resistors 98 and 99. The amplifier 100 and the associated components act in a well-known manner to provide phase compensation for the capstan servomechanism.

The output terminal of the amplifier 100 provides a signal which is used later in the circuit to energise a power amplifier for the capstan motor. Feedback is taken from the output of the amplifier 100 back to the store constituted by the capacitor 91 by way of a feedback loop constituted by a passive integrator. This integrator comprises a series resistor 106 and the capacitor 92. The time constant of this passive integrator is very much greater than the period of the tachometer signal at normal operating speeds for the capstan and may be, for example, of the order of 155 milliseconds. The capacitor 84 may be 10 µF, the capacitor 91 may be 3.3 µF, the capacitor 92 may be 47 µF and the resistor 100 may be 3.3 Mohms.

The effect of the integrator may be explained as follows. The signal which represents the speed of the motor is constituted by the charge transferred to the smaller capacitor 91. This signal is accurate only at the discrete tachometer pulse times which are quite widely separated if the motor runs at low speed. In the interval between these times the signal becomes less accurate, particularly if the aforementioned speed/inertia ratio is low. The integrator provides a signal which represents an integration of the torque applied to the motor. This latter signal will represent at each tachometer pulse time the anticipated change in speed of the motor during the following interval and accordingly the sum of the two signals is in effect the sum of a speed measured at the commencement of the interval and the change in speed during the interval. In this manner the speed information which is available discontinuously at a low rate is predicted. One important advantage of the prediction is the possibility of higher gain without instability in the servo system of a motor having a relatively low speed/inertia ratio.

Since the forward signal path goes via the noninverting input of amplifier 90 and the inverter input of amplifier 100, the sense of the feedback signal is negative, i.e. it opposes change in motor speed.

It may be desirable, though not of consequence to the present invention, to monitor the energisation of the capstan not only to provide speed change prediction but also to provide, for use elsewhere in the tape transport, an indication of the torque applied by the capstan and thereby an indication of tension in the tape. The output signal from the amplifier 100 is indicative of the torque applied to the capstan motor. This output, as it appears on line 105, is monitored by a circuit 107 which comprises a comparator amplifier 107a of which the non-inverting input is referenced by a voltage divider comprising resistors 108 and 109, connected between the positive rail 86 and ground, and of which the inverting input is connected to the line 105 by way of a resistor 110. The amplifier 107 has a parallel resistive/capacitative feedback circuit 113 and feeds by way of a resistor 111 an output terminal 112. In practice, although as has been said it is of no consequence to the present invention, the circuit 106 may provide low pass filtration of the output signal on the line 105 and also offsetting of it so as to provide at the output 112 a signal which varies between 2 volts and 8 volts as the energisation of the capstan varies from a maximum to a minimum.

The line 105 is connected by way of a resistor 114 to the non-inverting input of an amplifier 115 which has a capacitative feedback impedance 116 and of which the inverting input is connected by way of a resistor 117 to the positive rail 86. This amplifier 115 is an input stage for a power amplifier 119 of which a first stage is constituted by two complementary transistors 120 and 121 of which the emitters are connected in common to the output of amplifier 115 by way of the resistor 118. The bases of the transistors 120 and 121 are connected together to the junction of a voltage divider constituted by resistors 122 and 123 connected between the positive rail and ground. The collector of the transistor 120 is connected to the base of a power transistor 124 of which the emitter is connected to the base by way of a resistor 126 and is also connected to a positive rail 127.

The collector of the transistor 121 is connected to the base of a power transistor 125 of which the emitter is connected to the base of the same transistor by way of a resistor 128 and is also connected to a rail 129 at zero volts.

To the junction 130 between the collectors of transistors 124 and 125 is connected a capstan motor commutator circuit 131 of previous mention. This circuit always takes the full current output from the transistors 124 and 125 and, as has been mentioned, serves only to provide, in known manner, switching for the winding 66 of the capstan motor at appropriate times. Inserted between the capstan motor commutator circuit 131 and the zero volts rail 129 is a current sensing resistor 132 the ends of which are connected respectively through resistors 133 and 134 to the non-inverting and inverting inputs of the amplifier 115. This arrangement provides current feedback for the motor and provides some reduction of switching transients, It will be apparent that although in the specific example described above the capstan motor is controlled by a speed signal directly representing the speed of the motor, the invention is applicable to capstan servos controlled with reference to a recorded control track, which may provide either the speed signal or the reference with which it is compared. In particular, tape transports are often designed to be tape velocity servo controlled with reference to a control track recorded longitudinally along the transported tape. This tape velocity servo control is effected by the control of the angular velocity of the capstan motor. Ordinarily, the capstan servo is arranged to be switchably controlled by a signal derived from either the capstan tachometer or from the recorded control track. Such use of the recorded control track has the advantage over the use of the capstan tachometer signal in that the recorded control track provides actual tape velocity information. On the other hand, the capstan tachometer signal often is an inaccurate indication of actual tape velocity because of slippage between capstan and tape.

Accordingly the present invention includes the use of, for example, the aforementioned control track head to provide, as in the specific embodiment, pulses which likewise represent the speed of the tape at discrete times. Such pulses are obtainable by known techniques which need not be described herein and can be used instead of the pulses at the output of the amplifier 78.

I claim:

1. A control system fo an electric motor, in which system the speed of the motor is monitored to provide a repetitive signal which represents the said speed at discrete times, amplifier means for comparing the repetitive signal with a reference to provide an error signa and for amplifying said error signal, and a power amplifier coupled to drive the motor and coupled to be fed from said amplifier means, said power amplifier providing an output which is controlled in accordance with the speed signal and which determines the energisation of the motor and represents the torque output thereof, characterised in that the aforementioned torque output is integrated and combined with the speed signal in order to provide prediction of the speed signal in the intervals between the discrete times.

2. A control system for an electric motor which is coupled for driving a tape capstan, the system comprising a tachometer coupled to the capstan, signal processing circuits coupled to the tachometer to provide a signal which represents the speed of the motor at discrete times, a first amplifier, which receives an input corresponding to the difference between the speed signal and a reference to provide an output which determines the energisation of the motor and represents the torque output thereof, a power amplifier coupled to drive the capstan and coupled to be fed from said first amplifier and means for integrating the torque output from the power amplifier and combining said output with the speed signal so as to provide prediction of the speed signal in the intervals between the discrete times.

3. A servo control system for a tape capstan for driving the tape capstan at a regulated speed, comprising:
   a motor for driving the capstan;
   means for providing pulses at a rate representative of the speed of the capstan;
   a ramp signal generator responsive to said pulses to generate a repetitive ramp signal;
   a sampling means responsive to said pulses to sample the ramp; and
   a store for a signal representative of the sampling of the ramp;
   amplifier means for comparing the stored sample with a reference to provide an error signal and for amplifying said error signal;
   a power amplifier coupled to drive the capstan and coupled to be fed from said amplifier means; and
   a feedback circuit for said amplifier means, said feedback circuit including an integrating network which is connected to said store to modify the contents thereof.

4. A system as set forth in claim 3 wherein said store comprises a capacitor and wherein said integrator includes a second capacitor connected in series with said capacitor constituting said store and being of substantially greater capacitance than that capacitor.

5. A system as set forth in claim 3 wherein said means for generating a ramp comprises a charging network, and wherein the system includes a switching network operable in response to tachometer pulses to couple the charging network to the said store, to discharge said charging network and to recouple said charging network for charging.

6. A servo control system for a motor which drives a tape capstan, the control system comprising:
   means responsive to the speed of the capstan to provide a series of pulses constituting a speed signal;
   a ramp signal generator responsive to said pulses to provide a repetitive ramp signal;
   means responsive to said pulses for sampling said ramp;
   a store for the sampled ramp signal;
   an amplifier for comparing the sampled ramp signal with a reference and providing an amplifie output therefrom; and
   a feedback circuit for said amplifier, said feedback circuit providing an integrating function and being coupled to said store to provide prediction of change in said sampled ramp signal.

7. A system as set forth in claim 6 further comprising a power amplifier coupled to be fed by the said amplifier and coupled to energise the said commutator circuit.

8. A system as set forth in claim 7, further comprising means for monitoring current in said commutator circuit and for applying a feedback signal representative of said current to said power amplifier.

9. In a servo control system for the control of a tape capstan which is coupled to be driven by a brushless DC motor, and further including means for producing a repetitive ramp signal and means for sampling the ramp signal, the improvement which is characterised by the combination of:
   a first capacitor for storing a sample of the ramp signal;
   amplifier means for comparing the sample with a reference and providing an amplified output therefrom; and
   a feedback circuit for said amplifier, said feedback circuit including a passive integrator including a second capacitor which is in series with and of substantially greater capacitance than the first capacitor.

10. A control system for an electric motor driving a tape capstan, in which system the motor is controlled to govern the speed of the capstan with reference to a repetitive signal which represents the tape's speed, which is monitored at discrete times, amplifier means for comparing the repetitive signal with a reference to provide an error signal and for amplifying said error signal, and a power amplifier coupled to drive the motor and coupled to be fed from said amplifier means, said power amplifier providing an output which is controlled in accordance with the speed signal and which determines the energisation of the motor and represents the torque output thereof, characterised in that the aforementioned torque output is integrated and combined with the speed signal in order to provide prediction of the speed signal in the intervals between the discrete times.

* * * * *

UNITED STATES PATENT AND TRADEMARK OFFICE
CERTIFICATE OF CORRECTION

PATENT NO. : 4,591,768
DATED : May 27, 1986
INVENTOR(S) : Stefan Kudelski

It is certified that error appears in the above-identified patent and that said Letters Patent is hereby corrected as shown below:

```
Column  2, line 22, delete "v:ew", insert --view--;
Column  5, line 68, delete "connectes", insert --connects--;
Column  7, line 44, delete "107", insert --107a--;
           line 48, delete "106", insert --107--;
Column  8, line 19, delete "," (comma), insert --.-- (period);
           line 49, delete "fo", insert --for--;
           line 53, delete "signa", insert --signal--;
Column 10, line  3, delete "amplifie", insert --amplifier--.
```

Signed and Sealed this

Second Day of December, 1986

Attest:

DONALD J. QUIGG

Attesting Officer

Commissioner of Patents and Trademarks